(12) United States Patent
Wu et al.

(10) Patent No.: US 7,359,584 B2
(45) Date of Patent: Apr. 15, 2008

(54) POLARIZATION BEAM SEPARATOR AND COMBINER

(75) Inventors: Pingfan P. Wu, Willingboro, NJ (US);
Liang-Ju Lu, Eden Prairie, MN (US);
Zhicheng Yang, Burnsville, MN (US);
Boying Barry Zhang, Lawrenceville, NJ (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/644,640

(22) Filed: Dec. 22, 2006

(65) Prior Publication Data

US 2007/0189657 A1 Aug. 16, 2007

Related U.S. Application Data

(62) Division of application No. 10/846,084, filed on May 14, 2004, now Pat. No. 7,206,479, which is a division of application No. 10/010,815, filed on Nov. 13, 2001, now Pat. No. 6,741,764.

(51) Int. Cl.
G02B 6/26 (2006.01)
(52) U.S. Cl. .................. 385/11; 385/27; 385/36; 359/495; 359/496; 359/497
(58) Field of Classification Search ............... 385/11, 385/14, 16, 15, 17, 39, 27, 36; 357/497, 357/485, 483
See application file for complete search history.

(56) References Cited

U.S. PATENT DOCUMENTS

| 4,472,797 | A | 9/1984 | Nicia |
| 5,850,493 | A | 12/1998 | Cheng |
| 5,982,539 | A | 11/1999 | Shirasaki |
| 6,014,256 | A | 1/2000 | Cheng |
| 6,018,418 | A | 1/2000 | Pan et al. |
| 6,049,426 | A | 4/2000 | Xie et al. |
| 6,052,228 | A | 4/2000 | Xie et al. |
| 6,282,025 | B1 | 8/2001 | Huang et al. |
| 6,493,473 | B1 | 12/2002 | Wooten |

*Primary Examiner*—Frank G. Font
*Assistant Examiner*—James P. Hughes
(74) *Attorney, Agent, or Firm*—Carlson, Caspers, Vandenburgh & Lindquist (57) ABSTRACT

The present invention relates to a device for use in a fiber optic system that may be a communication system, a sensing system or other system using guided-wave optical components. Reducing the number of lenses required to couple the waveguides and the free-space paths in the device offers the dual advantages of a reduced component count and simplified alignment. In an exemplary device having a first and second waveguides, a birefringent optical system defines bi-directional, polarization-dependent free-space paths. One of the bidirectional, polarization-dependent, free-space paths couples at least the first waveguide to the second waveguide. The birefringent optical system includes at least one prism for bending one of the polarization-dependent paths in a clockwise direction and one of the polarization-dependent paths in a counterclockwise direction.

13 Claims, 10 Drawing Sheets

POLARIZATION BEAM SEPARATOR AND COMBINER

CROSS-REFERENCE TO RELATED APPLICATIONS

This application is a divisional application of U.S. patent application Ser. No. 10/846,084, filed on May 14, 2004 now U.S. Pat. No. 7,206,479, which is a divisional application of U.S. patent application Ser. No. 10/010,815, filed on Nov. 13, 2001, which issued as U.S. Pat. No. 6,741,764, both of which are incorporated by reference.

FIELD OF THE INVENTION

The present invention is directed generally to a fiber optic device, and more particularly to devices that can split or combine light signals according to the polarization of the light signals.

BACKGROUND

Optical fibers find many uses for directing beams of light between two points. Optical fibers have been developed to have low loss, low dispersion, polarization maintaining properties and can also act as amplifiers. As a result, optical fiber systems find widespread use, for example in optical communication applications and remote sensing.

Wavelength, optical power and polarization are important properties of the light signals propagating in a fiber optic system. Components within the system may modify the propagation of the signals by changing one or more of these properties. For example, multiple signals may be transmitted through a single fiber optic by combining the outputs from a plurality of laser transmitters, each transmitter having an output wavelength that is restricted to a unique spectral band. Amplitude and/or frequency modulation may be used to encode information on the transmitter outputs. The polarization property may be used for network operations that include the tuning, multiplexing, demultiplexing and switching of light signals, for example.

Systems that utilize the polarization property of light often require light signals to be separated or combined according to their polarization state. A single fiber optic device may be designed to carry out both processes, separating signals from a combined input that propagates through the device in a first direction and combining polarized signals that propagate through the device in the opposite direction.

Polarization beam separator/combiners for use in fiber optic systems may use non-guiding optical components to separate/combine the optical signals as they propagate through the device along free-space optical paths. Collimating lenses are typically used to couple the light propagating along the free-space optical paths to the input/output waveguides with a one-to-one correspondence between lenses and waveguides. Thus a polarization separator/combiner with three input/output waveguides typically incorporates three lenses that must be accurately aligned with respect to the waveguides and the free-space optical paths.

Conventional polarization separator/combiners share several common disadvantages that derive from the one-to-one correspondence between fibers and focusing optical systems. For example, the low-loss propagation of light is facilitated by the accurate alignment of the optical focusing assemblies to the optical fibers. Alignment tolerances may be of the order of one micron and must be maintained against both temperature variations and vibration during the operational lifetime of the device. Typically, the optical components are housed in a mechanical alignment and support assembly that increases in complexity, size and cost with the number optical coupling components. It is, therefore, disadvantageous to use a dedicated optical focusing assembly to couple each of the optical fibers

SUMMARY OF THE INVENTION

Generally, the present invention relates to a device for use in a fiber optic system that may be a communication system, a sensing system or other system using guided-wave optical components.

Reducing the number of lenses required to couple the waveguides and the free-space paths offers the dual advantages of a reduced component count and simplified alignment. It is, therefore, advantageous to provide a polarization splitter/combiner incorporating non-guiding optical components that interact with light propagating along free space paths, the free space paths coupled to a number, N, of input/output waveguides by a number, M, of focusing elements where M<N.

One embodiment of the invention is directed to an optical device that includes a first waveguide, a second waveguide, and a birefringent optical system with bidirectional, polarization-dependent free-space paths. One of the bidirectional, polarization-dependent, free-space paths couples at least the first waveguide to the second waveguide, the birefringent optical system including at least one prism for bending one of the polarization-dependent paths in a clockwise direction and one of the polarization-dependent paths in a counter-clockwise direction.

Another embodiment of the invention is directed to an optical device that includes a first waveguide, at least a second waveguide, and a folded optical system with bidirectional, polarization-dependent free-space paths that couple the first waveguide and the at least a second waveguide. The optical system includes a birefringent path separator that is traversed by light propagating along the free-space paths in a first direction and in a second direction approximately opposite to the first direction.

Another embodiment of the invention is directed to an optical device that includes a first waveguide, a second waveguide coupled to the first waveguide via a first bidirectional, polarization dependent path, and a third waveguide coupled to the first waveguide via a second bidirectional, polarization dependent path. A Wollaston prism- is disposed on the first and second bi-directional, polarization dependent paths. The first and second bidirectional, polarization dependent paths overlap between the first waveguide and the Wollaston prism. A first converging optical subsystem is disposed to couple light between the second waveguide and the Wollaston prism and between the third waveguide and the Wollaston prism. The first converging optical subsystem includes at least one focusing element common to the first and the second bidirectional, polarization dependent paths.

Another embodiment of the invention is directed to an optical device that includes a first waveguide, a second waveguide, a third waveguide, and a converging optical system. A birefringent optical system defines a first polarized optical path between the first waveguide and the second waveguide and defines a second polarized optical path between the first waveguide and the third waveguide. The polarization of light propagating along the first polarized optical path is orthogonally polarized to the polarization of light propagating along the second polarized optical path. The converging optical system includes at least one focusing element disposed on both the first and second polarized optical paths where the first polarized optical path is spatially separated from the second polarized optical path.

Another embodiment of the invention is directed to an optical communications system that includes a transmitting unit, a receiving unit and an optical transport system coupled to carry optical information signals between the transmitting unit and the receiving unit. At least one of the transmitting unit, the receiving unit, and the optical transport system include an optical device for coupling a first light beam to a second polarized light beam and a first beam to an orthogonally polarized light beam. The optical device includes a first waveguide and a second waveguide, and a birefringent optical system with bi-directional, polarization-dependent free-space paths. One of the paths couples at least the first waveguide to the second waveguide. The birefringent optical system includes at least one prism for bending one of the polarization-dependent paths in a clockwise direction and bending one of the polarization-dependent paths in a counterclockwise direction.

Another embodiment of the invention is directed to an optical communications system that includes a transmitting unit, a receiving unit and an optical transport system coupled to carry optical information signals between the transmitting unit and the receiving unit. At least one of the transmitting unit, the receiving unit, and the optical transport includes an optical device for coupling a first light beam to a second polarized light beam. The optical device includes a first waveguide, a second waveguide and a folded optical system with bidirectional, polarization-dependent free-space paths that couple the first waveguide and at least the second waveguide. The folded optical system includes a birefringent path separator that is traversed by light propagating along the free-space paths in a first direction and second, approximately opposite direction.

Another embodiment of the invention is directed to an optical communications system that includes a transmitting unit, a receiving unit, and an optical transport system coupled to carry optical information signals between the transmitting unit and the receiving unit. At least one of the transmitting unit, the receiving unit, and the optical transport include an optical device for coupling a first light beam to a second polarized light beam. The optical device includes a first waveguide, a second waveguide coupled to the first waveguide via a first bi-directional, polarization dependent path, and a third waveguide coupled to the first waveguide via a second bi-directional, polarization dependent path. A Wollaston prism is disposed on the first and second bi-directional, polarization dependent paths, the first and second bidirectional, polarization dependent paths overlapping between the first waveguide and the Wollaston prism. A first converging optical subsystem couples light between the second waveguide and the Wollaston prism and between the third waveguide and the Wollaston prism. The first converging optical subsystem includes at least one focusing element common to the first and the second bi-directional, polarization dependent paths.

Another embodiment of the invention is directed to a method of coupling light propagating in a first waveguide to polarized light propagating in at least a second waveguide. The method includes propagating the light along first and second bidirectional, polarization-dependent free-space paths. The polarization of light propagating along the first bi-directional, polarization-dependent free-space path is orthogonal to the polarization of light propagating along the second bidirectional, polarization-dependent free-space path. The method also includes bending the first polarization-dependent path in a counterclockwise direction and the second polarization-dependent path in a clockwise direction with a prism.

Another embodiment of the invention is directed to a method of coupling light in a first waveguide to at least a second waveguide. The method includes propagating the light along bidirectional, polarization-dependent free-space paths. The paths include a first path for propagating polarized light and a second path for propagating light polarized orthogonally to polarization of light propagating along the first path. The method also includes traversing the light though a birefringent path separator in a first direction and in a second, approximately opposite direction.

Another embodiment of the invention is directed to a method of coupling light between a first waveguide and second and third waveguides. The method includes propagating the light along bidirectional, polarization-dependent free-space paths. This includes propagating polarized light along a first path between the first and second waveguides and propagating polarized light, polarized orthogonally relative to light propagating along the first path, along a second path between the first and third waveguides. The method also includes spatially separating and bending the first and second paths with a Wollaston prism.

Another embodiment of the invention is directed to a method of coupling between a first waveguide and second and third waveguides. The method includes interacting the light with a birefringent optical system along a first optical path between the first and second waveguides and a second optical path between the first and third waveguides. Light propagating along the second path has a polarization orthogonal to a polarization of light propagating along the first path where the first and second paths are spatially separated. The method also includes coupling the light between the birefringent optical system and the second and third waveguides with a converging optical subsystem having at least one focusing optical element common to the first and second paths where the first and second paths are spatially separated.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical fiber systems, and is believed to be particularly suited to combining and separating beams of polarized light. The approaches presented here may be simpler in construction, easier to align and lower in cost than conventional systems.

A typical fiber optic polarization combiner/separator is a three-port device that is designed to couple light propagating in a first waveguide with a combination of polarization states to polarized light with a first polarization direction propagating in a second waveguide and polarized light with a second orthogonal polarization direction in a third waveguide. If the beams propagate from the second and third waveguides to the first, the device acts as a polarization beam combiner. If the beams propagate in the opposite direction from the first waveguide to the second and third waveguides, the device acts as a polarization separator.

Figure 1:
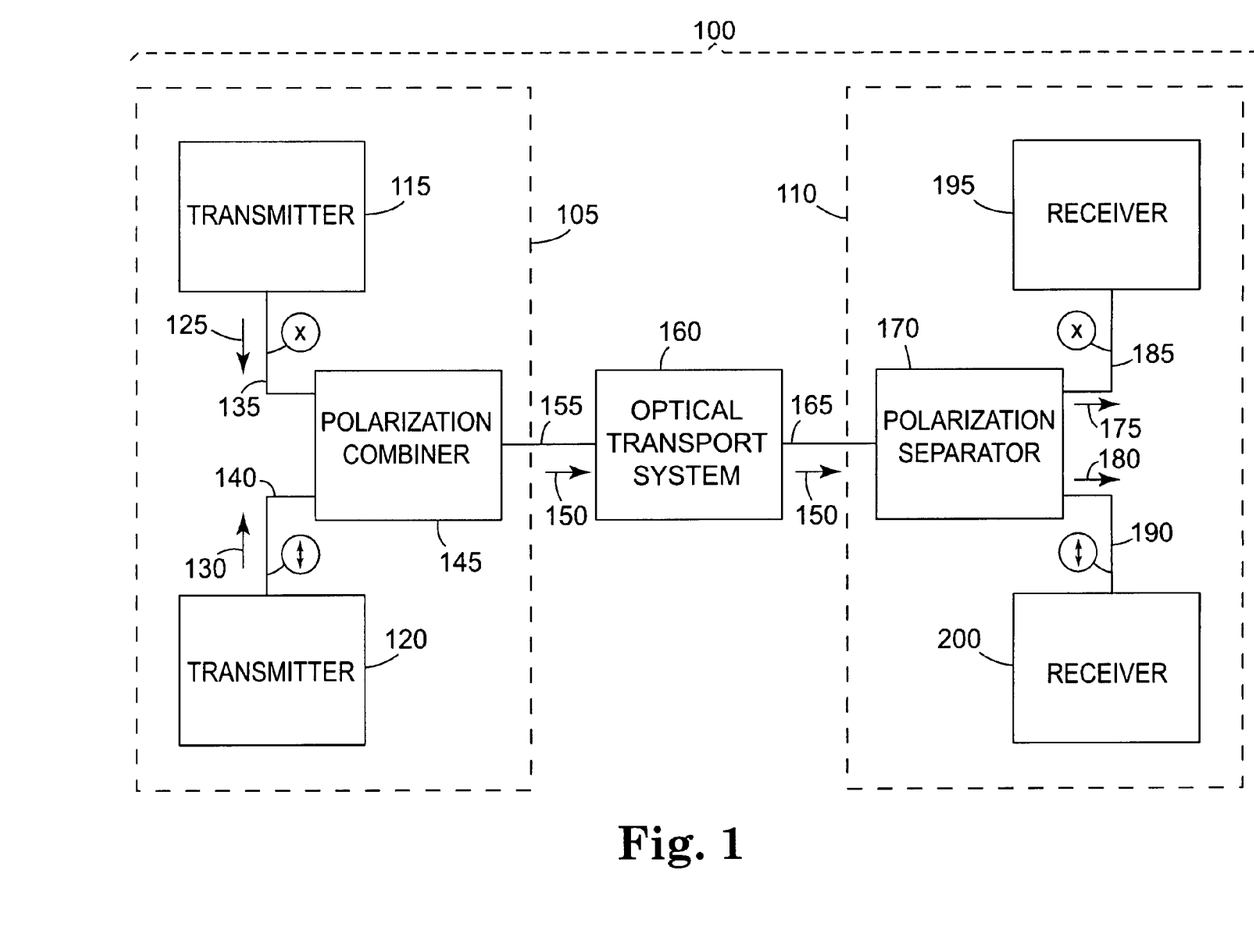
FIG. 1 schematically illustrates a polarization multiplexed optical communications system.

Polarization combiner/separators may find a number of applications in an optical fiber communications network. For example, the polarization-multiplexed system 100 of FIG. 1 is designed to transport an optical signal with combined polarization from a transmitting unit 105 to a receiving unit 110. The transmitting unit 105 includes two laser transmitters 115,120 that transmit polarized optical signals. These signals may, for example, include a number of wavelength-multiplexed channels that are combined by the transmitters 115, 120 according to a dense wavelength division multiplexing (DWDM) standard.

In the system of FIG. 1, the optical signal 125 from the laser transmitter 115 may be polarized in a first direction and the optical signal 130 from the laser transmitter 120 may be polarized in a second, orthogonal direction. The optical signals 125,130 from the laser transmitters 115,120 propagate through polarization-maintaining optical fibers 135,140 to the polarization combiner/separator 145. This unit is configured to combine the polarized signals 125, 130 to form an output signal 150 with combined polarization states. The output signal 150 propagates through the transmitting unit output fiber 155 to the polarization-maintaining optical transport system 160. The transport system 160 carries the polarization-multiplexed signal 150 to the receiving unit input fiber 165. In the receiving unit 110, a second polarization separator/combiner 170 separates the two polarization components of the optical signal 150 and couples the orthogonally polarized optical signals 175, 180 to the optical fibers 185, 190. The optical receivers 195, 200 recover the information from the optical signals 175, 180.

Figure 2:
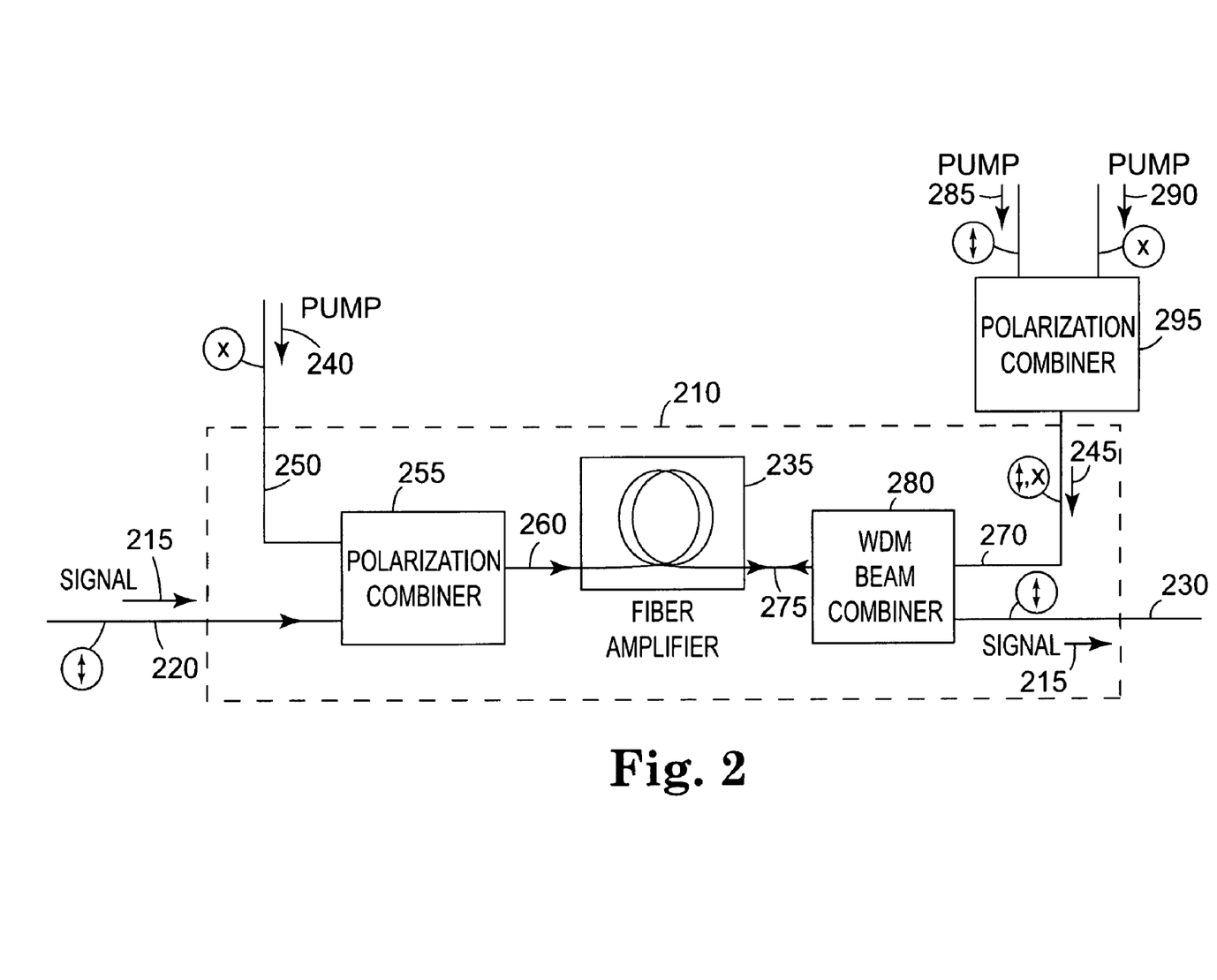
FIG. 2 schematically illustrates an optical amplifier pumped by polarized lasers.

Within an optical transport system, polarization separator/combiners may be used, for example, to combine the pump and the signal beams in a waveguide amplifier. FIG. 2 schematically illustrates one particular embodiment of a waveguide amplifier unit 210 that increases the optical power of a polarized information signal 215. The information signal 215, which may have a wavelength of about 1.55 μm, is transported to the amplifier unit 210 by an optical fiber 220 and propagates from the amplifier unit 210 along the optical fiber 230. The fibers 220, 230 may be polarization-maintaining.

The fiber amplifier 235, which may be an erbium fiber amplifier or other suitable type of optical amplifier, is configured to transfer power from the pump beams 240, 245 obtained from one or more pump lasers, to the optical signal 215. The polarization combiner 255 combines the polarized signal 215 propagating along the amplifier unit input fiber 220 with the orthogonally-polarized pump beam 240 that is transported to the polarization combiner 255 by the optical fiber 250. The fiber amplifier input fiber 260 transports the combined signal and pump beams to the fiber amplifier 235.

Optionally, a second pump beam 245 with mixed polarization states, propagating along optical fiber 270 may be coupled to the amplifier output fiber 275 by a WDM beam separator/combiner 280 that couples/separates beams according to wavelength. The WDM beam separator/combiner 280 also couples the optical signal 215 to the amplifier unit output fiber 230. The pump beam 245 may include the output of two orthogonally-polarized pump beams 285, 290 that have been combined, for example, by a polarization combiner 295. The optional pump beam 245 and the signal 215 propagate in opposite directions through the fiber amplifier 235 and the pump beam 240 and the signal 215 propagate in the same direction through the fiber amplifier 235.

Figure 3:
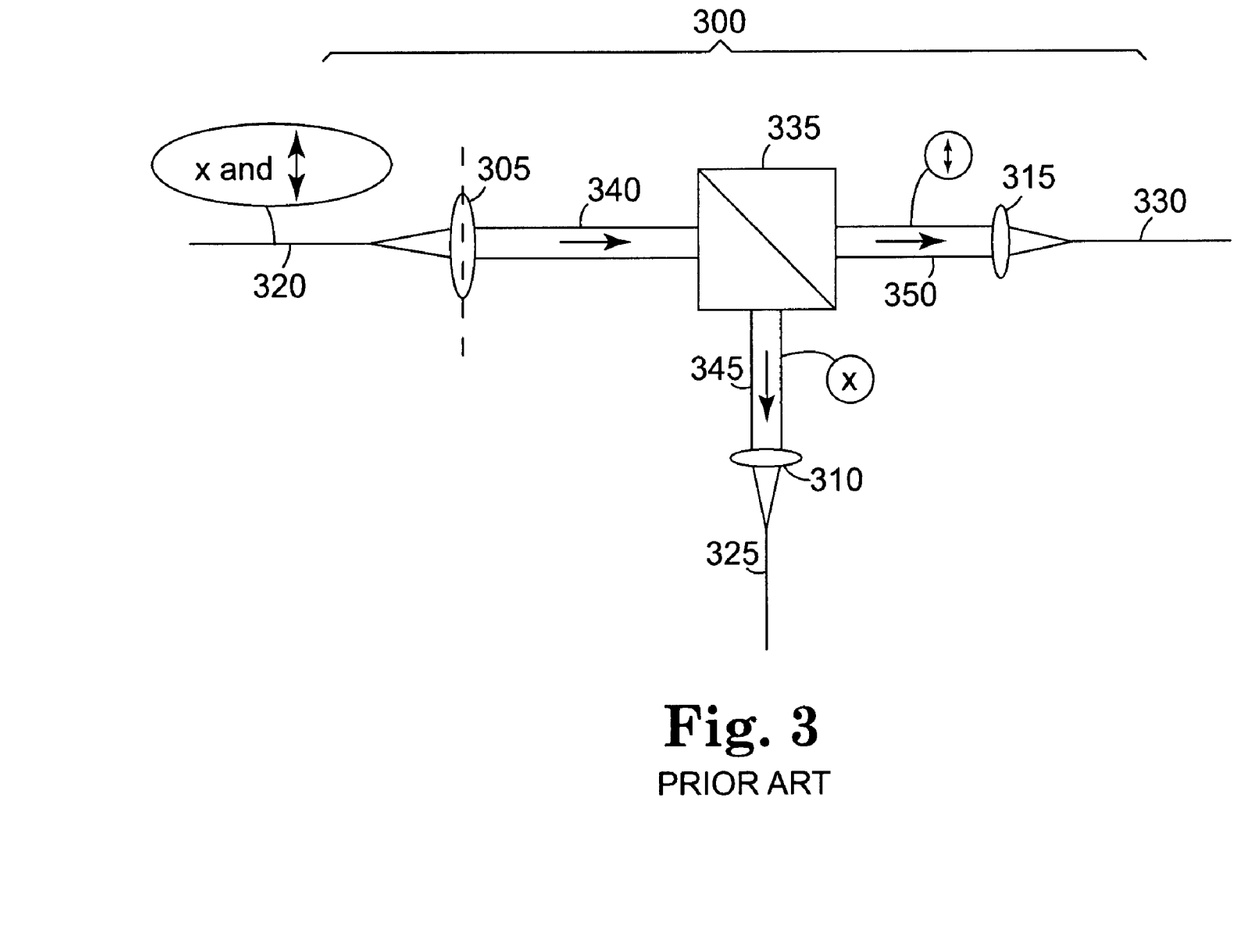
FIG. 3 schematically illustrates a transmissive fiber optic polarization separator according to the prior art.

A fiber optic polarization separator/combiner unit may include bulk optical components and a plurality of focusing optical systems. The optical fibers that transport optical signals to and from a polarization separator/combiner unit are coupled to free space paths within the unit by focusing optical assemblies. The bulk optical components typically interact with the light propagating along the free-space paths, separating and/or combining the light according to polarization. There is typically a one-to-one correspondence between focusing optical assemblies and waveguides, the focusing optical assemblies being positioned to collimate the diverging light from input fibers and focus the light propagating along the free space paths into the output fibers A conventional fiber optic polarization separator, for example as illustrated in FIG. 3 as separator 300 typically includes three focusing lens assemblies 305-315 that couple the fibers 320-330 to the polarizing beam splitter 335 along the free space beam paths 340-350. A combined polarization optical signal propagating along the waveguide 320 may be collimated by the focusing optical system 305 and directed to the polarization beam splitter 335 along the optical path 340. The polarization beam splitter may, for example, be a cube polarizer. The beam splitter 335, directs light having a first polarization direction along the optical path 350 and light polarized in the orthogonal direction along the optical path 345. The focusing optical systems 310, 315 focus the light propagating along the free space optical paths 345, 350 into the output optical fibers 325, 330.

Conventional polarization separator/combiners share several common disadvantages that derive from the one-to-one correspondence between fibers and focusing optical systems. In the polarization separator 300, for example, the low-loss propagation of light is facilitated by the accurate alignment of the optical focusing assemblies 305-315 and the optical fibers 320-330 and the alignment optical of the focusing assemblies 305-315 and the free space paths 340-350. Alignment tolerances may be of the order of one micron and must be maintained against both temperature variations and vibration during the operational lifetime of the polarization separator 300. Typically, the optical components are housed in a mechanical alignment and support assembly that increases in complexity, size and cost with the number optical coupling components. It is, therefore, disadvantageous to use a dedicated optical focusing assembly to couple each of the optical fibers 320-325 to the free space paths 340-350.

Figure 4A:
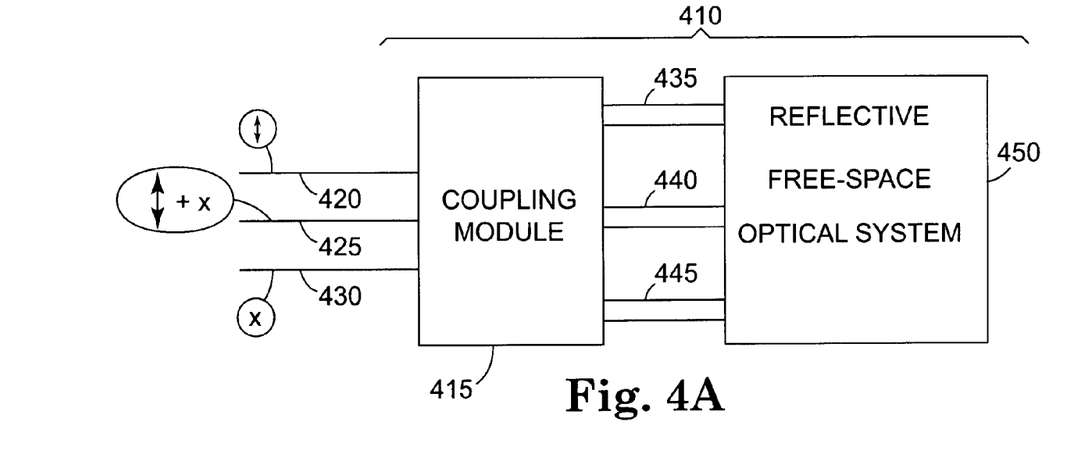
FIG. 4A schematically illustrates a reflective fiber optic polarization separator/combiner according to the present invention.

According to the present invention, the number of optical focusing assemblies required to couple a reflective or transmissive bulk optic polarization separator/combiner to a set of input/output fibers may be reduced through advantageous design of the bulk optic polarization separator/combiner and/or the coupling optical system. For example, FIG. 4A schematically illustrates a reflective fiber optic polarization separator/combiner 410 that utilizes an optical coupling module 415 to couple the optical fibers 420-430 to the free space optical paths 435-445. The free space paths 435-445 are coupled according to the polarization state of the light propagating along the free space paths by the reflective free space optical system 450.

The optical coupling module 415 is further detailed in U.S. Pat. No. 6,829,152, which is incorporated herein by reference. In one particular embodiment, an optical coupling module is an assembly that is couplable, for example, to the optical fibers 420-430, comprising a first focusing element and a second focusing element, the first element positioned on a first optical axis to receive output light beams from the optical fibers and direct the light beams to intersect an optical axis at a first intersection position. The second focusing element is spaced apart from the first focusing element by a distance along the optical axis, the separation being selected to parallelize the light beams received from the first optical element. When compared to conventional fiber coupling methods, the coupling module method of FIG. 4A advantageously reduces the number of focusing optical assemblies. Corollary advantages may include a simplified alignment procedure and smaller transverse dimensions of a packaged fiber optic polarization separator/combiner.

Figure 4B:
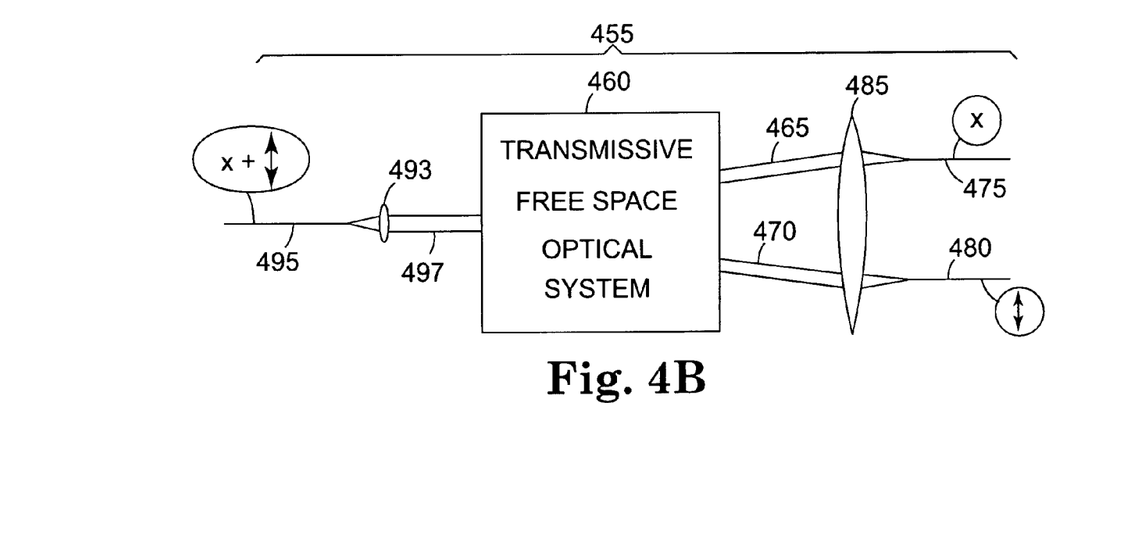
FIG. 4B schematically illustrates a transmissive fiber optic polarization separator/combiner according to the present invention.

The number of focusing optical assemblies included in a transmissive fiber optic polarization separator/combiner may also be reduced by modifying the bulk optical system in such a way that a single optical focusing assembly couples multiple optical fibers to their associated free space optical paths. For example, FIG. 4B schematically illustrates a transmissive fiber optic polarization separator 455 wherein the transmissive free space optical system 460 interacts with combined polarization light propagating along the free space optical path 497 from the fiber 495, dividing the light into two polarized light beams that are directed along the non-parallel free space optical paths 465, 470. The free space optical paths 465, 470 are coupled to the optical fibers 475, 480 by a first optical focusing assembly 485. A second optical focusing assembly 493 couples the optical fiber 495 to the free space optical path 497.

The transmissive fiber optic polarization separator 455 illustrated in FIG. 4B has fewer optical focusing assemblies than conventional polarization separators. Corollary advantages of the invention may include a simplified alignment procedure and smaller transverse dimensions of a packaged fiber optic polarization separator/combiner.

Figure 5:
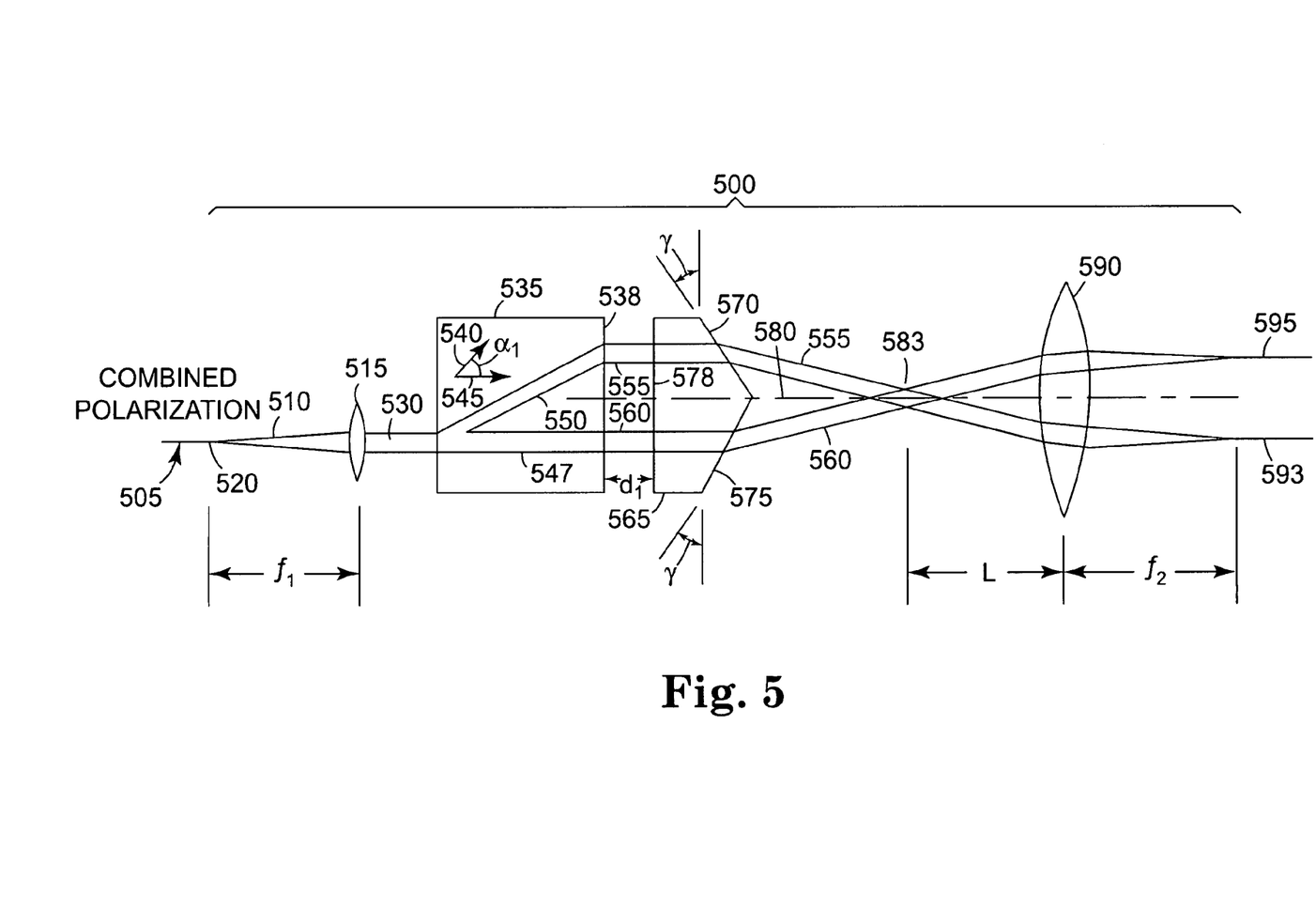
FIG. 5 schematically illustrates a transmissive fiber optic polarization separator/combiner that includes a birefringent material and a prism.

FIG. 5 illustrates a transmissive fiber-optic polarization separator 500 embodying features of the present invention. A light signal having combined polarization states is transported to the polarization separator 500 by an optical fiber 505. The divergent light beam 510 exiting the fiber is approximately collimated by the first optical focusing assembly 515 that may be separated from the fiber end 520 by a distance, $f_1$, that is approximately equal to the focal length of the optical focusing assembly 515. The first optical focusing assembly 515 may be, for example, a single lens, or a combination of lenses. The collimated light beam from the optical focusing assembly 515 propagates along the free-space optical path 530 and interacts with the birefringent beam separator 535. The birefringent beam separator 535 may, for example, be a birefringent crystal with its optical axis direction 540 oriented at an acute angle, $\alpha_1$, to the light propagation direction 545 of the free space path 530 in the plane of FIG. 5.

Within the birefringent beam separator 535, the portion of the light that is polarized in the ordinary direction propagates along a first path 547 and experiences the ordinary index of refraction, $n_o$, while the portion of the light polarized in the extraordinary direction experiences the extraordinary index of refraction, $n_e$, and propagates along a second path 550 at an angle with respect to the first path 547. Thus, portions of a light beam with combined polarization states that propagates towards the birefringent beam separator 535 along the optical path 530 may be separated into two polarized light beams that propagate through the birefringent beam separator 535 along separate optical paths 547, 550.

The physical separation of the beams at the surface 538 typically increases with the absolute value of the difference between the ordinary and extraordinary indices of refraction, also known as the birefringence, and the length of the separator 535. The separator length may be advantageously minimized by selecting a material with a large birefringence at the desired operating wavelength. The separator 535 may also be advantageously selected to have high transparency at the wavelength of interest, physical properties that are insensitive to temperature and humidity, and physical properties that facilitate optical polishing and coating. Materials that combine these properties at wavelengths between 1.5 μm and 1.65 μm include yttrium vanadate ($YVO_4$), rutile ($TiO_2$) and α-barium borate (α-$BaB_2O_4$).

The polarized light beams leaving the birefringent crystal 535 propagate along free-space optical paths 555, 560 that are typically parallel and non-overlapping. A prism 565, that may be a symmetric roof prism, with two facets tilted at acute angles γ, relative to the entrance surface 578, bends the free space optical paths 555, 560 in clockwise and counter-clockwise directions so that the free space optical paths 555, 560 intersect a plane containing the prism axis of symmetry 580 in a region 583 located between the prism and the focusing optical assembly 590. In some embodiments, the optical paths 555, 560 may also intersect each other in the region 583.

A focusing optical assembly 590, which may comprise a single lens, or a combination of lenses, couples the optical paths 555, 560 to the optical fibers 593, 595. Typically, the separation, $f_2$, of the optical fibers 593, 595 from the focusing optical assembly 590 is approximately equal to the focal length of the focusing optical assembly 590. The distance, L, between the focusing optical assembly 590 and the region 583 is typically greater than or equal to the focal length of the focusing optical assembly 590 and may be advantageously chosen to be equal to the distance, $f_2$.

It may also be advantageous to join the birefringent beam separator 535 and the prism 565 by decreasing the distance, d, between the two beam separator 535 and the prism 565. Optical contacting techniques, for example, may be used to join the two elements 535 and 565 and an antireflection (AR) coating may be applied to at least one of the surfaces, 538, 578 to minimize the reflected portions of light beams propagating along the paths 547, 550, 555 and 560. Alternatively, the surfaces may be joined with an adhesive, for example, an ultraviolet-light-cured transparent optical epoxy. The adhesive may be applied to directly to the surfaces 538, 578 or to the edges of the birefringent beam separator 535 and the prism 565 that are adjacent to the surfaces 538, 578. Reflection at the prism facets 570, 575 may also be minimized by applying AR coatings to the facets.

In the illustrated embodiment 500, the first focusing optical assembly 515 and the second optical focusing assembly 590 may be Geltech 350140 lenses with a common focal distance, $f=f_1=f_2$. The prism may be a pentagon that is formed from K10 glass that is supplied by Schott Optical Glass Co. with acute angles γ that are equal to 9.9°. The birefringent beam separator may be manufactured from yttrium vanadate.

The transmissive fiber optic polarization beam separator 500 may also be operated as a transmissive fiber optic polarization beam combiner by reversing the direction of light propagation through the device. Polarized light beams propagating towards the optical focusing assembly 590 along the optical fibers 593, 595 may be combined by the polarization beam separator 500 to exit as a light beam with combined polarization states propagating away from the beam separator 500 along the optical fiber 505.

The transmissive fiber optic polarization beam separator 500 may also be used to couple counterpropagating beams. For example, a polarized beam propagating towards the polarization beam separator 500 along the optical fiber 595 may be coupled to the fiber 505 as a beam that propagates from the beam separator 500. Simultaneously, an orthogonally-polarized beam propagating towards the beam separator 500 along the fiber 505 may be coupled to the fiber 593 as a beam propagating away from the beam separator 500. Alternatively, a beam with mixed polarization propagating towards the device along the fiber 505 may be separated into two orthogonally-polarized beams while polarized beams propagating towards the beam separator 500 along the fibers 593, 595 may be combined into a mixed polarization beam propagating away from the beam separator along the fiber 505.

Figure 10:
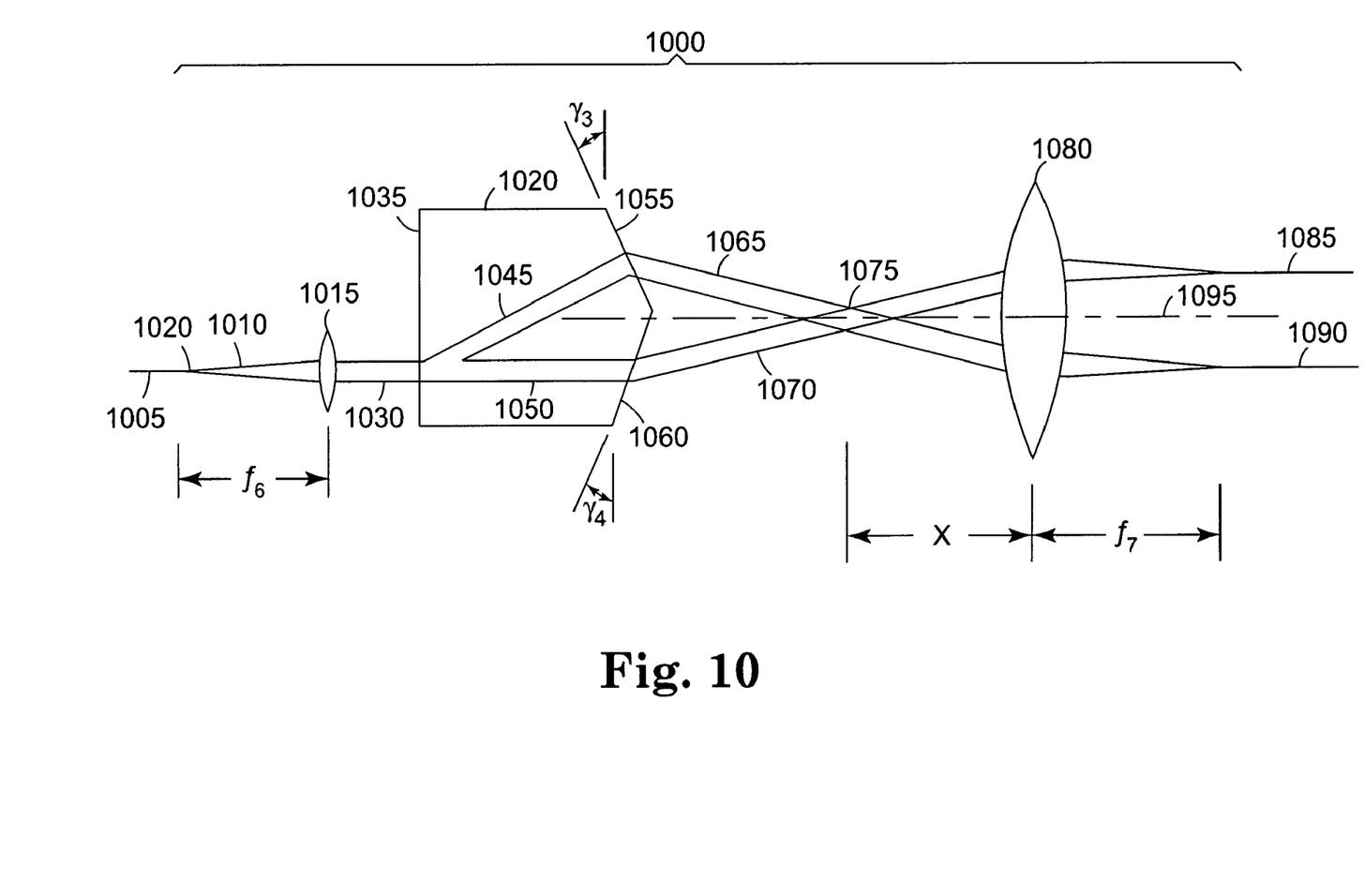
FIG. 10 schematically illustrates a transmissive fiber optic polarization separator incorporating a faceted birefringent beam separator.

FIG. 10 illustrates another embodiment of a transmissive fiber-optic polarization separator 1000. A light signal having combined polarization states is transported to the fiber optic polarization separator 1000 by an optical fiber 1005. The divergent light beam 1010 exiting the fiber is approximately collimated by the first optical focusing assembly 1015 that may be separated from the fiber end 1020 by a distance, $f_6$, that is approximately equal to the focal length of the optical focusing assembly 1015. The optical focusing assembly 1015 may be, for example, a single lens, or a combination of lenses. The collimated light beam from the optical focusing assembly 1015 propagates along the free-space optical path 1030 and interacts with the faceted birefringent beam separator 1020.

The faceted beam separator 1020 is formed from a birefringent material and oriented so that light with a combined polarization state propagating towards the birefringent beam separator 1020 is selected according to polarization state at the surface 1035. For example, light that is polarized in the ordinary direction propagates along optical path 1050 and light polarized in the extraordinary direction propagates along the optical path 1045. Light propagating along the optical path 1045 is coupled to the free space optical path 1065 at the facet 1055. The facet 1055 may be AR-coated to reduce reflection losses and is tilted at an angle, $\delta_3$, with respect to the input surface 1035. The angle, $\delta_3$, is selected to bend the light propagating along the path 1045 in a clockwise direction. Light propagating along the optical path 1050 is coupled to the free space optical path 1070 at the facet 1060. The facet 1060 is tilted at an angle, $\delta_4$, with respect to the input surface 1035. The angle, $\delta_4$, is selected to bend the light propagating along the path 1050 in a counterclockwise direction. The facet 1060 may also be AR-coated to minimize reflections.

The physical separation of the beams at the facets 1060, 1055 increases with the absolute value of the birefringence, and the length of the separator 1020. The separator length may be advantageously minimized by selecting a material with a large birefringence at the desired operating wavelength. The separator 1020 may also be advantageously selected to have high transparency at the wavelength of interest, optical properties that are insensitive to temperature and humidity, and physical properties that facilitate optical polishing and coating. Materials that combine these properties at wavelengths near 1.5 μm include yttrium vanadate ($YVO_4$), rutile ($TiO_2$) and alpha barium borate ($\alpha$-$BaB_2O_4$).

A focusing optical assembly 1080 with an axis 1095 couples the free space paths 1065, 1070 to the optical fibers 1085, 1090. The focusing optical assembly may comprise, for example, a single lens or group of lenses. Typically, the free-space paths 1065, 1070 cross a plane containing the axis 1095 in a beam crossing region 1075. They may also intersect each other in the beam crossing region 1075. The optical fibers 1085, 1090 may be disposed in a parallel configuration and separated from the optical assembly 1080 by a distance, $f_7$, that may be equal to the focal length of the focusing optical assembly 1080. Advantageously, the distance, X, between focusing assembly 1015 along the optical fiber 1005 the optical assembly 1080 and the beam crossing region 1075 may be approximately equal to the distance, $f_7$.

The fiber optical polarization separator 1000 may be operated as a fiber optic polarization combiner by reversing the beam direction. Orthogonally-polarized light beams propagating towards the optical focusing assembly 1080 along the optical fibers 1085, 1090 will be combined by the polarization separator 1000 and propagate away from the optical focusing assembly 1015 along the optical fiber 1005. Counterpropagating beams may also be combined and separated simultaneously.

Figure 6:
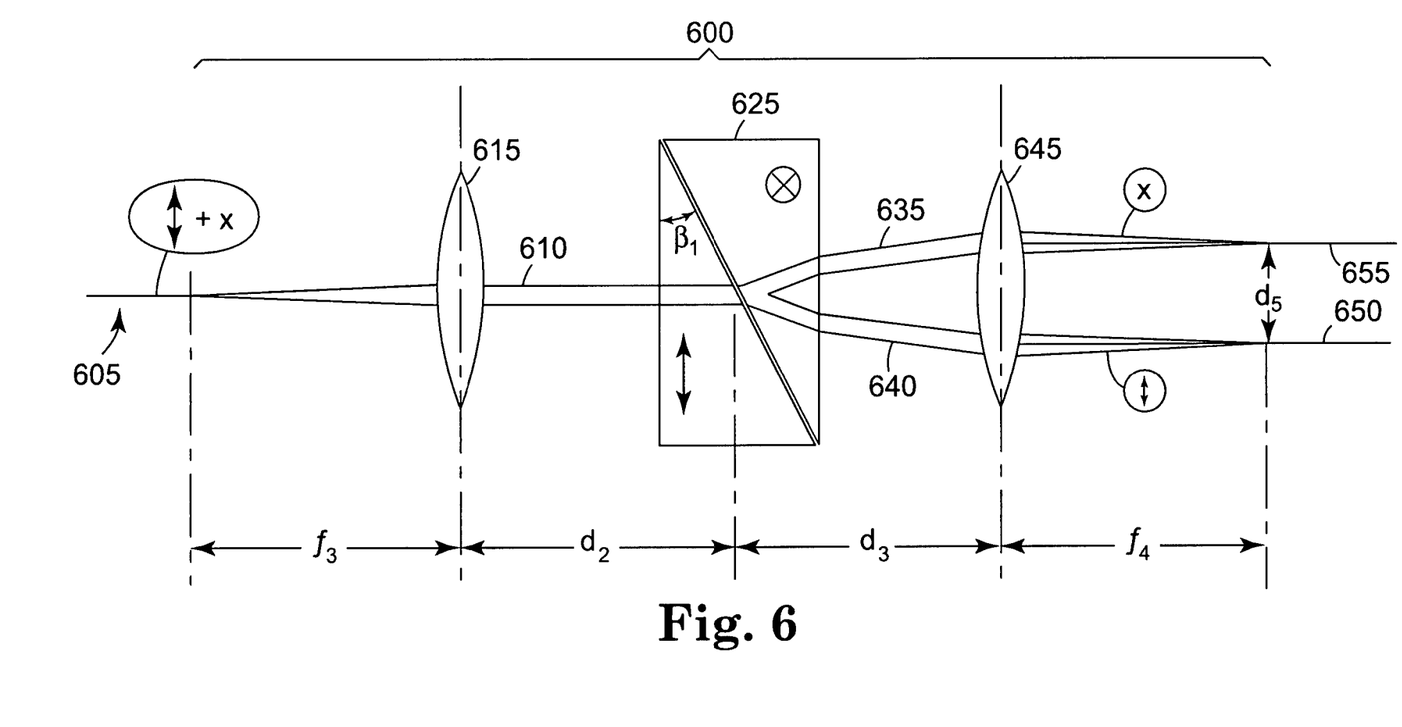
FIG. 6 schematically illustrates a transmissive fiber optic polarization separator/combiner that includes a Wollaston prism.

FIG. 6 schematically illustrates another embodiment of a transmissive fiber optic beam separator 600 according to the present invention. Light with combined polarization states may be separated into polarized light beams by propagating light with combined polarization states along the optical fiber 605 from left to right. The optical fiber 605 is coupled to the free space optical path 610 by the focusing optical assembly 615, that may comprise one or more lenses. Typically, the focusing optical assembly 615 is separated from the end of the optical fiber 605 by a distance that is approximately equal to the focal length, $f_3$, of the optical focusing assembly 615.

Light with combined polarization states propagating along the free-space optical path 610 interacts with a Wollaston prism 625 and is separated into orthogonally-polarized beams that are bent and coupled to the free space optical paths 635, 640. The Wollaston prism 625 may be formed in a conventional fashion from two birefringent prisms having a common prism angle, $\beta_1$. The center of the Wollaston prism 625 is separated by a distance, $d_2$, from the focusing optical assembly, 615.

The optical focusing assembly 645 couples the free space paths.635, 640 to the optical fibers 650,655 that are typically separated from the optical focusing assembly 645 by a distance, $f_4$, that is approximately equal to the focal length of the optical focusing assembly 645. The optical focusing assembly 645 may also be positioned at a distance, $d_2$, from the Wollaston prism 625. Advantageously, the distances $f_3$ and $f_4$, and the distances, $d_2$ and $d_3$, may be equal to a common focal length, $f_5$.

The Wollaston prism 625 may advantageously be fabricated from yttrium vanadate or rutile. For example, the focusing optical assemblies 615, 645 may be Geltech lenses with part number 350140 and the Wollaston prism may be formed from yttrium vanadate with a prism angle, $\beta_1$, of 22.6°. Locating the components at distances, $d_2$ and $d_3$, that are equal to the common focal length of the Geltech lenses provides a physical separation distance, $d_5$, of the beams at the end of the polarized fibers 655, 650 that is equal to 250 µm.

The transmissive beam separator/combiner 600 may also be operated as a beam combiner. In this case, polarized light beams propagating towards the left in the optical fibers 650, 655 are combined into a single beam that is coupled into the optical fiber 605.

Figure 7:
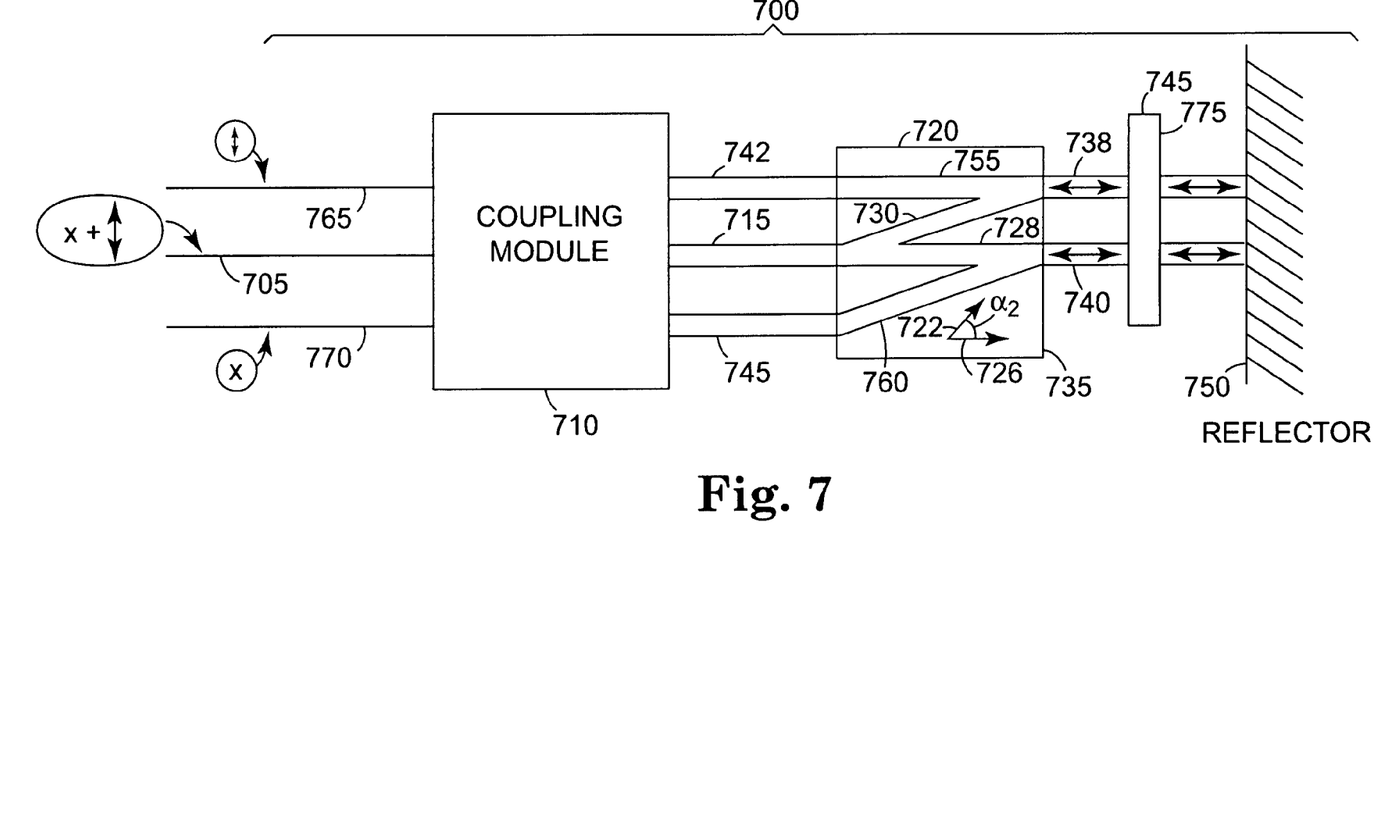
FIG. 7 schematically illustrates a reflective fiber optic polarization separator/combiner that includes a birefringent material and a polarization rotator.

An embodiment of a reflective fiber optic polarization beam separator/combiner 700 according to the present invention is illustrated schematically in FIG. 7. When operated as a beam separator, light with combined polarization states propagates through the optical fiber 705 to the beam separator/combiner 700. A coupling module 710 as described in U.S. patent application Ser. No. 09/181,145 couples the optical fiber 705 to the free space optical path 715. Light propagating along the optical path 715 is approximately collimated and interacts with the birefringent beam separator 720. The beam separator may, for example, be formed from a birefringent material that is oriented with its optical axis direction 722 oriented at an acute angle, $\alpha_2$, with respect to the direction 726 of the free space optical path 715.

Light with ordinary polarization propagates through the birefringent beam separator 720 in a first direction along the optical path 728. Light polarized in the extraordinary direction propagates through the birefringent beam separator 720 in a second direction along the optical path 730. At the beam separator surface 735 the optical paths 728, 730 are coupled to approximately parallel and separate bidirectional optical paths 738, 740.

The polarized light beams propagating from the birefringent beam splitter 720 along the bidirectional optical paths 738, 740 interact with a polarization rotator 745 and are redirected to the left by the reflector 750. As the polarized light beams propagate to the left from the reflector 750 to the birefringent beam separator 720 along the bidirectional optical paths 738, 740, they interact a second time with the polarization rotator 745. The polarization rotator and mirror are configured to rotate the polarization of the light beams propagating along the bidirectional paths 738, 740 by approximately 90° as they travel from the beam separator surface 735 to the reflector 750 and return to the beam separator surface 735. The polarization separator may be, for example, a quarter wave retardation plate with its optical axis tilted at 45° with respect to the polarization directions of the light beams propagating along the free space paths 738, 740 at the beam separator surface 735.

Light propagating towards the beam separator 720 along the beam path 738 travels through the beam separator 720 along the ordinary polarization beam path 755 and is coupled to the free space beam path 742. Light propagating towards the beam separator 720 along the beam path 740 travels through the beam separator 720 along the extraordinary polarization beam path 760 and is coupled to the beam path 745. The optical coupling module 710 couples the free space paths 742, 745 to the optical fibers 765, 770.

The fiber optical polarization separator 700 may also operate as a beam combiner if orthogonally polarized light beams propagate towards the separator 700 along the optical fibers 755, 760. In this case, a beam with combined polarization is transported away from the polarization separator 700 by the optical fiber 705. Simultaneous beam separation and combination is also possible with bidirectionally propagating beams.

The mechanical complexity of the polarization separator 700 may be advantageously decreased by combining the reflector 750 and polarization rotator 745 into a single unit. This may be accomplished, for example, by joining the reflector 750 and polarization rotator 745 or by coating the reflector 750 directly on the surface 775 of the polarization rotator 745. The mechanical complexity of the polarization separator 700 may be also be decreased by joining the polarization rotator 745 and the birefringent beam separator 720. Additional mechanical simplification may be accomplished either by coating the reflector 750 directly on the joined polarization rotator 745 and beam separator 720 or by additionally joining the polarization rotator 745, beam separator 720 and reflector 750 to form a single mechanical assembly.

Figure 8:
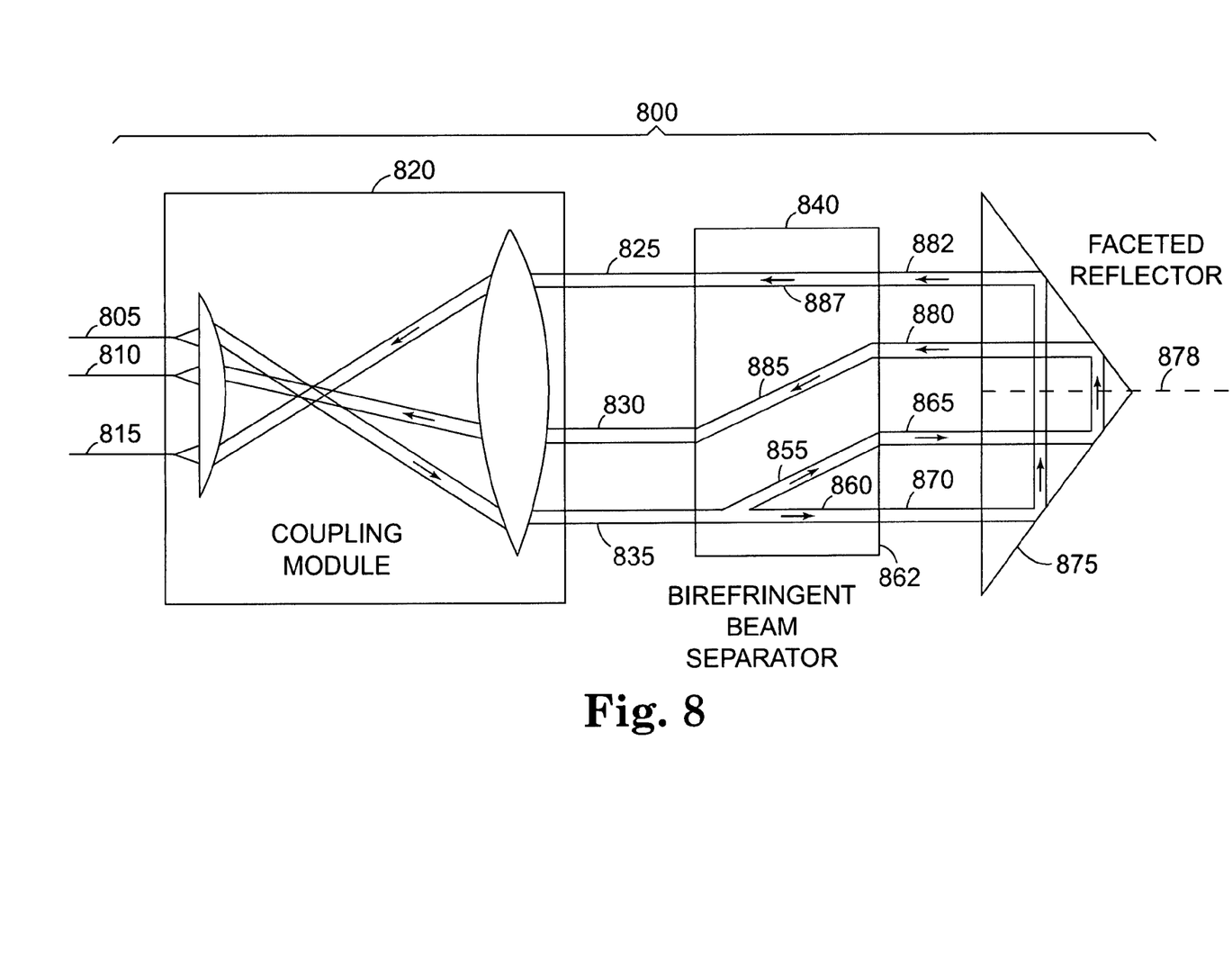
FIG. 8 schematically illustrates a reflective fiber optic polarization separator/combiner that includes a birefringent material and a faceted reflector.

FIG. 8 illustrates another embodiment of a reflective fiber optic beam separator/coupler 800 according to the invention. In polarization separating operation, light that may have a combined polarization state propagates towards the separator/coupler 800 along the optical fiber 805. Orthogonally-polarized light beams propagate to the left along the optical fibers 810, 815. The coupling module 820 couples the optical fiber 805 to the free space path 835, the optical fiber 810 to the free space path 830 and the optical fiber 815 to the free space path 825. The operation and design of the coupling module is described in U.S. patent application Ser. No. 09/181,145.

Light with combined polarization states from the fiber 805 propagates to the right along the free space path 835 and interacts with the birefringent beam separator 840. The birefringent beam separator 840 may be formed from a birefringent crystal with large birefringence and high transparency at the wavelength of the light propagating through the device.

Light propagating along the free space path 835 propagates through the birefringent beam selector along one of two optical paths according to the polarization state of the light. Light polarized in the extraordinary direction propagates along the optical path 855 and light polarized in the ordinary direction propagates along the optical path 860. At the beam separator surface 862, the optical path 855 is coupled to the free space optical path 865 and the optical path 860 is coupled to the free space optical path 870. Typically, the length of the birefringent beam separator 840 is chosen to completely separate the optical paths 855 and 860 at the surface 862.

Light propagating along the free space optical paths 865, 870 is redirected towards the birefringent beam separator 840 by the faceted reflector 875 that may have an axis of symmetry 878. Light propagating to the right along the optical path 870 is redirected to the left along optical path 882 and light propagating to the right along the optical path 865 is redirected to the left along the optical path 880. The faceted reflector is typically positioned to symmetrically dispose the beam path 870 and the beam path 882 on opposite sides of the symmetry axis 878 and to symmetrically dispose the beam path 865 and the beam path 880 on opposite sides of the symmetry axis 878.

The birefringent beam separator extraordinary polarization optical path 885 couples the free space path 880 to the free space 830 and the ordinary polarization optical path 887 couples the free space path 882 to the free space path 825. The optical coupling module couples the free space paths 825, 830 and the optical fibers 810, 815 in such a way the that light polarized in a first direction and propagating to the left along the optical path 830 is transported from the. polarization separator 800 by the optical fiber 810 and orthogonally-polarized light propagating along the free space path 835 is transported from the polarization separator 800 by the optical fiber 805.

The fiber optic polarization separator 800 may be operated as a fiber optic polarization combiner by reversing the direction of light propagation. Orthogonally-polarized beams propagating towards the coupling module 820 along the optical fibers 805, 810 may be combined by the polarization separator 800 into a beam- with combined polarization states propagating away from the optical coupler 820 on the optical fiber 815. Simultaneous combining and separating operation may also be possible with counterpropagating beams.

Figure 9:
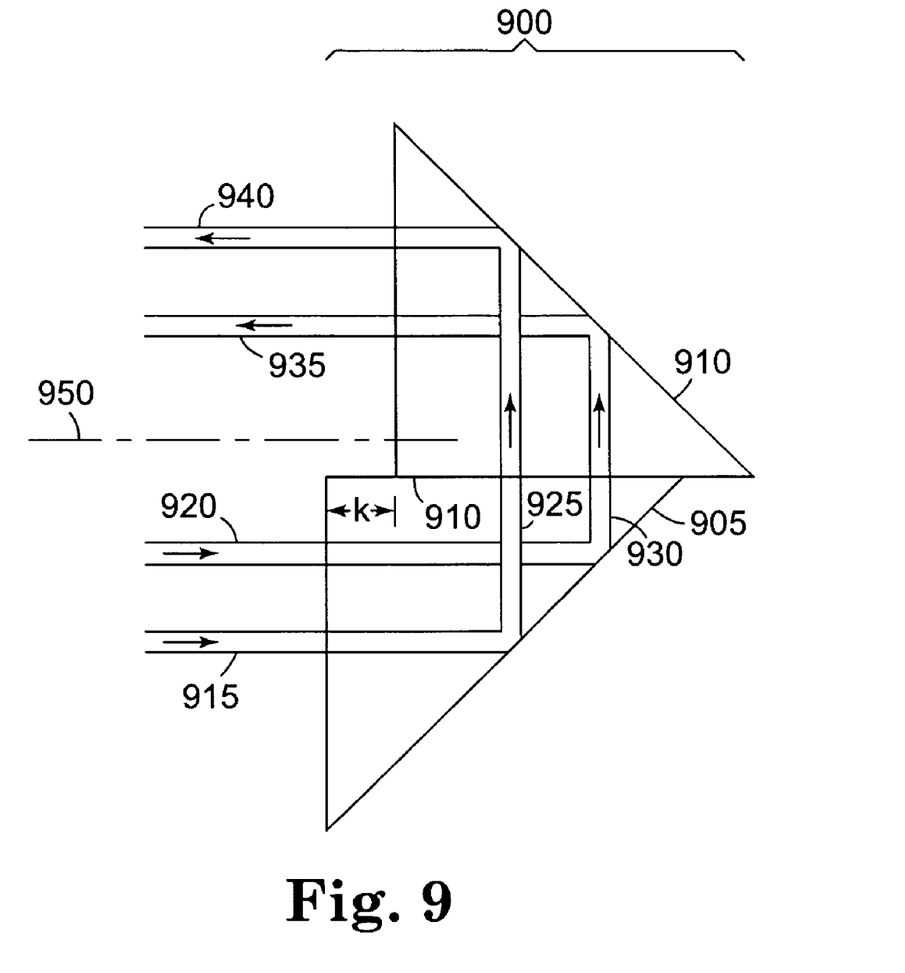
FIG. 9 schematically illustrates a faceted reflector formed from two prisms

A faceted reflector may alternatively be an asymmetric assembly that is formed, for example, from two right angle prisms 905, 910. The faceted reflector assembly 900 that is illustrated in FIG. 9, for example comprises two right angle prisms that are optically coupled along the plane 910. Light propagating towards the prism 905 along the input free space optical path 915 is coupled by the path 925 to light propagating away from the prism 910 along the output free space optical path 940. Light propagating towards the prism 905 along the input optical path 920 is similarly coupled to the light propagating away from the prism 910 along the optical path 935 by the optical path 930. While the faceted reflector lacks a symmetry axis, the beam paths are symmetric with respect to the axis 950. For example, the beam paths 915 and 940 are symmetrically disposed on either side of the axis 950 and the beam paths 920 and 935 are symmetrically disposed on either side of the axis 950. The separation between symmetrically disposed beam paths may be adjusted by changing the displacement, k, between the prism surfaces.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical device, comprising:
a first waveguide;
a second waveguide; and
a birefringent optical system with bi-directional, polarization-dependent free-space paths, a first bidirectional, polarization-dependent, free-space paths coupling at least the first waveguide to the second waveguide, the birefringent optical system including a birefringent splitter to split the bi-directional, polarization-dependent free-space paths, the bi-directional, polarization-dependent free-space paths being substantially collimated at the birefringent element, and at least one prism comprising a surface having non-parallel prism facets for respectively bending one of the polarization-dependent paths in a clockwise direction and one of the polarization-dependent paths in a counterclockwise direction.

2. The optical device as recited claim 1, wherein the birefringent optical system includes a first converging optical subsystem for coupling at least the first waveguide to light propagating along the free-space paths and a second converging optical subsystem for coupling the second waveguide to light propagating along at least one of the free-space paths.

3. The optical device as recited in claim 2, wherein at least one of the converging optical subsystems includes a lens.

4. The optical device as recited in claim 1, wherein light propagating in the second waveguide is polarized.

5. The optical device as recited in claim 1, wherein the light propagates through the birefringent optical system from the first waveguide to the second waveguide.

6. The optical device as recited in claim 1, wherein the light propagates through the birefringent optical system from the second waveguide to the first waveguide.

7. The optical device as recited in claim 1, wherein the prism is formed from a birefringent material.

8. The optical device as recited in claim 1, wherein the prism is attached to the birefringent splitter.

9. The optical device as recited in claim 1, wherein the prism is integrated with the birefringent splitter.

10. The optical device as recited in claim 2 additionally comprising a third waveguide, the second converging optical subsystem coupling the second waveguide to the polarization dependent path bent in a clockwise direction and third waveguide to the polarization dependent path bent in a counterclockwise direction.

11. The optical device as recited in claim 10, wherein the prism has a symmetry axis and the polarization dependent paths intersect a plane containing the symmetry axis in a crossover region between the prism and the second and the third waveguides.

12. The optical device as recited in claim 11 wherein the first converging optical subsystem and the second converging optical subsystem have a common focal distance, f, and the second optical subsystem is separated by approximately the common focal distance, f, from the crossover region, the first waveguide is separated from the first converging optical subsystem by the common focal distance, f, and the second converging optical subsystem is separated from the second waveguide by approximately the common focal distance, f.

13. The optical device of claim 1, wherein the prism is formed of a material different from the material of the birefringent splitter.

* * * * *